United States Patent Office 3,043,818
Patented July 10, 1962

3,043,818
POLYMERIC COMPOSITIONS
Stanley Tocker, Wilmington, Del., assignor to E. I. du Pont de Nemours and Company, Wilmington, Del., a corporation of Delaware
No Drawing. Filed Mar. 20, 1959, Ser. No. 800,653
11 Claims. (Cl. 260—88.2)

This invention relates to the manufacture of thermoplastic polymeric films. More particularly, it relates to the preparation of polyhydrocarbon films suitable for conversion to bags, containers and similar packages.

The invention will be described as it applies to polyethylene films. However, it will be clear that the invention is equally applicable to shaped structures of all types composed of polymers of alpha-olefins in general. Thus, filaments, foils, rods, tubes, as well as self-supporting films, are embraced by the present invention. The statements regarding prior polyethylene products and the utility of the present invention are equally applicable to polymers of propylene, butylene, styrene, pentene-1, hexene-1, heptene-1, octene-1, decene-1, 3-methyl butene-1, 4-methyl pentene-1, 4,4-dimethyl pentene-1, isobutylene, etc. as well as polymers of ethylene.

Polyethylene, in the form of a self-supporting film, displays many properties which make it particularly desirable as a packaging film. The polyethylene film is characterized by high impact strength, high tenacity, high elongation combined with chemical inertness and low permeability to water vapor. However, polyethylene films lack some requisites for some important applications. The most outstanding is its lack of adherability. Thus, printing, a necessary treatment for successful use of packaging materials, is performed with great difficulty due to the lack of adherability of printing inks to the film's surface. Coatings and laminates, useful for special purposes such as improving heat-sealability, etc., are difficult to apply because of the film's lack of adherability to itself and other materials.

One object of the present invention is a process for remedying the above-described situation, i.e., a process for improving the surface adherability. Another object is to form a novel polymeric composition that displays improved properties, particularly improved adherability to itself and other materials. Other objects will appear hereinafter.

The objects are accomplished by a polymeric composition comprising 65–99 mole percent of a recurring group having the structure:

$$-\overset{\underset{\displaystyle R}{|}}{\underset{\underset{\displaystyle H}{|}}{C}}-\overset{\underset{\displaystyle H}{|}}{\underset{\underset{\displaystyle H}{|}}{C}}-$$

wherein R is selected from the group consisting of hydrogen and alkyl having 1–8 carbon atoms, and 1–35 mole percent of at least one recurring group selected from the group consisting of:

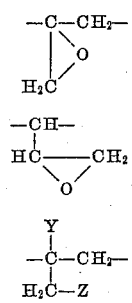

and

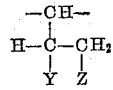

wherein Y and Z are radicals selected from the group consisting of hydroxyl, acyloxy, nitrite and nitroso, wherein Y and Z may be the same when they are hydroxyl and are dissimilar in all other cases, and the nitrite and nitroso groups must be mutually inclusive of each other.

Acyloxy radical

denotes an acyl radical to which oxygen is attached and wherein attachment of the combined radical to a given recurring group is through the oxygen atom. The term "mutually inclusive of each other" means that if a nitrite group is attached to a recurring group at the designation Y, a nitroso group must be attached at Z, and vice versa.

The process involves first copolymerizing 65–99 mole percent of the alpha-olefin with 35–1 mole percent of propadiene by subjecting the monomers, preferably in a liquid hydrocarbon or halogenated hydrocarbon such as hexane, benzene, toluene, tetrachloroethylene, etc., to a temperature of −40° to 300° C. and a pressure of 1–1000 atmospheres in the presence of a "coordination catalyst"; isolating the resulting polymer; and, thereafter, oxidizing the polymer by treatment with an oxidizing agent.

The preferred oxidizing agents are selected from the group consisting of percarboxylic acids, hydrogen peroxide, potassium permanganate, alkaline hypochlorites, oxides of nitrogen, chromic acid and concentrated nitric acid. Other oxidizing agents which may be used include periodic acid, the oxides of osmium, vanadium, chromium, selenium and silver, hypobromous acid, hypochlorous acid, lead tetraacetate, chromyl chloride, mercury salts, oxygen and ozone.

A "coordination catalyst" may be defined in its broadest sense as one formed by the reaction of a reducible polyvalent metal compound with an amount of a reducing agent sufficient to reduce the valence of the metal component to 2 or less. Specifically, the catalyst is composed of:

(A) A compound containing at least one metal of the group consisting of metals of Groups IVa, Va and VIa of the Periodic Table, iron, cobalt, copper, nickel and manganese, said metal having directly attached thereto at least one substituent from the group consisting of halogen, oxygen, hydrocarbon and —O-hydrocarbon; and (B) A reducing compound selected from the group consisting of metal hydrides and compounds having a metal of Groups I, II and III of the Periodic Table, said metal being above hydrogen in the electromotive series of metals, attached directly through a single bond to a carbon atom, said carbon atom selected from the group consisting of trigonal carbon and tetrahedral carbon.

In the above definitions, Periodic Table means Mendeléeff's Periodic Table of the Elements, 25th ed., Handbook of Chemistry and Physics, published by the Chemical Rubber Publishing Co.

Ordinarily, catalytic amounts of the components of the catalyst system may be used in the first step of the process. Thus, component (A) may comprise 0.01–20 millimoles or higher, preferably 0.2–20 millimoles, per liter of solvent plus monomers. The mole ratio of component (B)-to-component (A) in the catalyst system should be at least 1:1, preferably 1:1 to 100:1.

Component (A) in the catalyst system has been defined as a compound containing at least one metal selected from the group consisting of metals of Groups IVa, Va and VIa of the Periodic Table, iron, cobalt, copper, nickel and manganese, having directly attached to it a halogen atom, oxygen atom, hydrocarbon or —O—hydrocarbon group. Typical Group IVa metals are titanium, zirconium and hafnium; Group Va metals, vanadium, columbium and tantalum; Group VIa metals, chromium, molybdenum and tungsten. Specific examples of the compounds included in the above definition are titanium tetrachloride, titanium tetrafluoride, zirconium tetrachloride, niobium pentachloride, vanadium tetrachloride, vanadyl trichloride, tantalum pentabromide, cerium trichloride, molybdenum pentachloride, tungsten hexachloride, cobaltic chloride, ferric bromide, tetra(2-ethylhexyl)-titanate, tetrapropyl titanate, titanium oleate, octylene glycol titanate, triethanolamine titanate, tetraethyl zirconate, tetra(chloroethyl) zirconate, and the like.

Component (B) in the catalyst system has been defined as a reducing compound selected from the group consisting of metal hydrides and compounds having a metal of Groups I, II and III of the Periodic Table above hydrogen in the electromotive series, attached directly through a single bond to a trigonal or tetrahedral carbon atom. A trigonal carbon atom is a carbon atom having two single bonds and a double bond;

Groups which may be attached to a metal, which metal is attached to a trigonal carbon atom, are aryl groups or arylalkyl groups. By tetrahedral carbon atom is meant a carbon atom having four single bonds;

Groups which may be attached to a metal, which metal is attached to a tetrahedral carbon atom, are alkyl groups, aryl groups, alkylaryl groups and alkenyl groups. Specific examples of useful reducing agents included in this definition are phenyl magnesium bromide, lithium aluminum tetraalkyl, aluminum trialkyl, dimethyl cadmium, diphenyl tin, and the like.

Useful combinations of component (A) and component (B) compounds for use as catalyst systems in the invention include the following:

Vanadyl dichloride (VOCl$_2$) plus aluminum diisobutyl butoxide
Vanadyl trichloride (VOCl$_3$) plus aluminum triisobutyl
Vanadyl trichloride (VOCl$_3$) plus aluminum hydride (AlH$_3$)
Vanadyl trichloride (VOCl$_3$) plus lithium butyl
Vanadium dichloride (VCl$_2$) plus aluminum triisobutyl
Vanadium trichloride (VCl$_3$) plus aluminum isobutyl dichloride
Vanadium tetrachloride (VCl$_4$) plus aluminum isobutyl dibutoxide
Vanadium tetrachloride (VCl$_4$) plus aluminum triisobutyl
Vanadium tetrachloride (VCl$_4$) plus aluminum hydride (AlH$_3$)
2-ethyl hexyl vanadate plus aluminum triisobutyl
Titanyl dichloride (TiOCl$_2$) plus aluminum isobutyl dichloride
Titanium tetrachloride (TiCl$_4$) plus ethyl magnesium bromide
Titanium tetrachloride (TiCl$_4$) plus aluminum triisobutyl
Titanium tetrachloride (TiCl$_4$) plus lithium aluminum tetraisobutyl
Titanium tetrachloride (TiCl$_4$) plus sodium naphthalene
Tetraisopropyl titanate Ti(OC$_3$H$_7$)$_4$ plus aluminum triisobutyl
Tetraisobutyl titanate Ti(OC$_4$H$_9$)$_4$ plus sodium naphthalene
Cobaltous chloride (CoCl$_2$) plus aluminum triisobutyl
Cobalt hexammonium chloride Co(NH$_3$)$_6$Cl$_2$ plus aluminum triisobutyl
Manganese bromide (MnBr$_2$) plus aluminum triisobutyl
Manganese bromide (MnBr$_2$) plus zinc diisobutyl
Chromium chloride (CrCl$_3$) plus aluminum triisobutyl
Cuprous chloride (Cu$_2$Cl$_2$) plus aluminum triisobutyl
Ferric bromide (FeBr$_3$) plus aluminum triisobutyl
Molybdenum chloride (MoCl$_5$) plus aluminum triisobutyl
Nickel chloride (NiCl$_2$) plus aluminum triisobutyl Polymerization is preferably carried out in a solvent medium. Among the solvents which have been found useful in this step are hydrocarbons and halogenated hydrocarbons: hexane, benzene, toluene, cyclohexane, bromobenzene, chlorobenzene, o-dichlorobenzene, tetrachloroethylene, dichloromethane and 1,1,2,2,-tetrachloroethane. Heterocyclic compounds such as tetrahydrofuran, thiophene and dioxane may also be used.

The reaction conditions, temperature and pressure, at which polymerization is performed may be extremely mild. Temperatures of the reaction may range from —40° to 300° C. and pressures of 1 atmosphere to 1000 atmospheres may be used successfully. The optimum conditions of temperature and pressure are 0°–300° C. and not more than 500 atmospheres, respectively.

As an illustration of a method contemplated for carrying out the present invention, the catalyst system, e.g., vanadyl trichloride and aluminum triisobutyl, is mixed in the hydrocarbon solvent, e.g., n-hexane, under a blanket of nitrogen gas. Component (A), vanadyl trichloride, may be present to the extent of about 5 millimoles and component (B), aluminum triisobutyl, may be present to the extent of about 10 millimoles. After stirring for about ten minutes at a temperature of about 25° C., the nitrogen supply is cut off and the gas stream composed of ethylene and/or other hydrocarbon monomer or monomers having terminal ethylenic unsaturation with propadiene in the desired mole ratio is passed into the catalyst suspension. Alternatively, the monomers may be introduced first into the reaction vessel, followed by introduction of the catalyst. The order of adding catalyst and monomers is not critical to the present invention. After sufficient polymer is built up, the gas flow is stopped and water, methanol, ethanol or a similar low molecular weight alcohol, is added to destroy the catalyst. The copolymer or terpolymer (depending on the number of monomers used), is then isolated and purified in a manner known to those skilled in the art.

The mole ratio of propadiene-to-ethylene and/or other hydrocarbon monomer reacted should be such that the product of this step is composed of 1–35 mole percent propadiene (preferably 9–30 mole percent) and 99–65 mole percent (preferably 91–70 mole percent) of the other hydrocarbon monomer or monomers. It has been found that the reaction is very efficient so that a reaction mixture of about 1–35 mole percent propadiene and about 99–65 mole percent of the remaining monomer or monomers usually will provide the desired product.

The product of this step is a substantially linear polymer having pendant vinyl and methylene groups and having an inherent viscosity of at least 0.3. The different pendant groups result from the fact that propadiene may copolymerize with monomers by more than one mechanism. Thus, propadiene may appear in a carbon-to-carbon chain with a pendant methylene group:

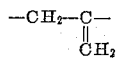

or it may appear in the carbon-to-carbon chain with a pendant vinyl group:

or any combinations of these. Most copolymers will contain some of each of the above types of structure, i.e., copolymers with propadiene will usually have some pendant methylene groups and some pendant vinyl groups. The present invention also contemplates copolymers with propadiene in the form of block copolymers, random copolymers or combinations of block and random. The determination of pendant vinyl groups and pendant methylene groups may be accomplished by Infrared Spectral Techniques[1] known to those skilled in the art.

In the next step, the polymer composed of 1-35 mole percent propadiene is oxidized. The polymer may be in the form of a particulate mass or a fiber or a film. Reaction may be carried out to any degree of conversion of the double bonds. Preferably, the polymer is shaped into a structure in ways well known to those skilled in the art prior to reaction. Thus, the polymer can be melt pressed at a temperature of about 150° C. or higher to form a film. Reaction can be effected with the entire polymeric structure or reaction may be limited to the surface of the structure.

A preferred oxidizing agent is peracetic acid. To oxidize the ethylene/propadiene copolymer prepared in the first step, the polymer may be placed in an aqueous solution of peracetic acid at a temperature of 20°-90° C. The oxidation reaction can add acetate, hydroxyl or epoxy groups to the polymer. Thus, the use of high temperature favors hydroxyl and acetate addition. High temperature and low pH, below 6, favors formation of hydroxyl derivatives. To form the epoxide, a buffer such as sodium acetate should be used along with the peracetic acid.

The time required to impart adherability to the film's surface depends on several factors. Higher temperatures, higher peracetic acid concentrations, and higher percentages of propadiene in the copolymer tend to reduce the time necessary for reaction. After reaction is complete, the product is separated from the mixture, washed with water and dried.

Depending on the conditions used, the product is an ethylene polymer having 1-35% of the recurring units of one or more of the following formulae:

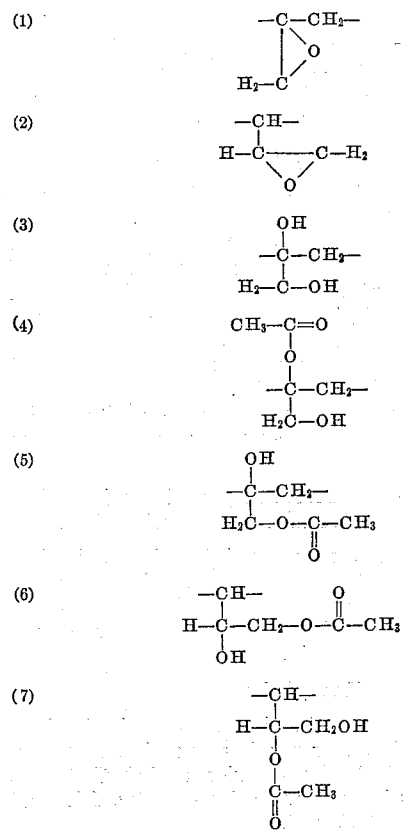

Although the oxidizing reaction is preferably carried out in an aqueous system, this is not a critical requirement. The reaction may be carried out in either aqueous or mixed aqueous/organic solvent systems depending on the solubility characteristics of the oxidizing agent, the solubility of the polymer and, to some extent, on the degree and nature of the effect to be produced. For example, if greater conversion is desired than is normally obtained in surface reactions it is advantageous to dissolve or at least swell the polymer in an organic solvent during attack by aqueous peracetic acid. The polymer need not be dissolved or swollen for a surface reaction of the polymer with aqueous peracetic acid.

The utility of polymers containing the attached hydroxyl, epoxy and acetoxy groups lies primarily in the adherability imparted to the polymer. Other important effects are also realized. The printability and dyeability are improved; soilability is reduced; static propensity is decreased; and the slip characteristic of the surface is enhanced. The polymers containing epoxy groups (Formulae 1 and 2), besides providing the above listed effects, also provide sites for further modification with chemical agents. Thus, reaction with salicylic acid substitutes salicylate groups for the epoxy groups which imparts light stability to the polymer. Reaction of the epoxy groups with thiols, such as propanethiol-1, substitutes thioether groups for the epoxy groups which imparts thermal stability to the polymer.

It has been found that since the chemical transformations occur on unsaturated groups appended to the polymer chain, while the chain itself is essentially unaffected, the desired characteristics of the parent polymer are retained in the final product. Thus, the final product displays satisfactory tensile strength, impact strength, flex resistance, etc. while its adherence to printing inks, coatings, other films such as regenerated cellulose and polyethylene terephthalate, etc. is increased substantially. Furthermore, it has been found that the adherability achieved shows no tendency to disappear upon aging.

The following examples are intended to provide a clearer understanding of the present invention. They should not be considered to limit the scope of the invention.

*Example I*

To 250 ml. of anhydrous cis-decalin under a blanket of nitrogen, were added successively with stirring, 0.5 ml. (5 millimols) of vanadyl trichloride and 10 ml. of 1 molar (10 millimols) of aluminum triisobutyl in n-hexane. After stirring the mixture for 10 minutes under the nitrogen blanket at 25°-27° C., the nitrogen source was cut off and an ethylene/propadiene gas stream in a mol ratio of 9/1 was passed into the catalyst suspension at a rate of approximately 160 ml. per minute. In an hour, polymer build-up was sufficient to make stirring ineffective. The gas flow was stopped and the catalyst was destroyed by mixing in 50 ml. of methanol. The copolymer was isolated and purified by filtration and then by washing in a Waring Blendor using, successively, 100 ml. of 5% concentrated hydrochloric acid in isopropanol, two 150 ml. portions of distilled water, and 100 ml. of methanol. The yield of polymer after removal of solvent was 6.8 grams.

Infrared absorption of the polymer showed that the material contained units derived from both ethylene and propadiene; the proportion of ethylene units being approximately 90% and the proportion of propadiene units 10%, as estimated from the infrared absorption curves. Partial extraction with toluene in a Soxhlet extractor showed no composition change, indicating that a copolymer had been obtained. The copolymer was melt pressed at a temperature of about 165° C. to form a clear film. The copolymer had an inherent viscosity of 2.0 (0.1 gram copolymer in 100 ml. of alpha-chloronaphthalene solution at 125° C.).

The film was then oxidized by placing it for 30 seconds in a beaker containing a solution of 40% peracetic acid

---

[1] W. M. D. Bryant and R. C. Voter, Journal of American Chemical Society, 75, 6113 (1953). F. W. Billmeyer, "Textbook of Polymer Chemistry," chapter 7, Interscience Publishers, 1957.

in water at a temperature of 50° C. The film was then washed with water and dried. The structure of the reaction product was as follows: a major proportion of recurring groups of —CH₂—CH₂— and a minor proportion of recurring groups of

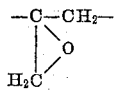

and

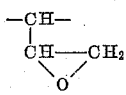

As control A, a linear polyethylene film was similarly treated with peracetic acid, washed and dried. Control B was the copolymeric film which was not treated with peracetic acid.

The three films were then tested for printability with the following results.

| Example: | Printability |
|---|---|
| I | Excellent. |
| Control A | Poor. |
| Control B | Poor. |

The printability test is carried out as follows: Printing ink (Multi-Brite 17W700 manufactured by Bensing Brothers and Deeney) is painted on the film in a very thin coating. The coated film is then dried at 70° C. for 10 minutes. "Scotch" cellophane tape is then pressed tightly against the coated surfaces. The tape is then ripped off. The quantity of ink that comes off with the tape indicates the quality of the ink-to-film bond, the printability:

(1) Excellent indicates none or only a trace of ink removed;
(2) Good, 1–5% removed;
(3) Fair, 5–10% removed;
(4) Poor, more than 10% removed.

*Example II*

The copolymeric film prepared as in Example I was reacted with an aqueous 40% peracetic acid solution at 20° C. for 20 minutes. After washing the film with water and drying, the film was examined by infrared methods and tested.

The reaction product contained epoxide groups along the polymer chain as shown in Example I.

The printability of the resulting film was excellent.

*Example III*

The copolymeric film prepared as in Example I was reacted for three hours with an aqueous solution containing 50% calcium hypochlorite at a temperature of 25° C. After washing the film with water and drying, the film was examined by infrared absorption methods and tested for printability.

As a control, a polyethylene film treated similarly with calcium hypochlorite was tested for printability. The results were:

| Example III | Excellent printability. |
|---|---|
| Control | Poor printability. |

The reaction product showed a substantial reduction of unsaturated groups and instead the appearance of hydroxyl groups.

*Example IV*

The copolymeric film prepared as in Example I was reacted for one hour with an aqueous solution containing 30% hydrogen peroxide at a temperature of 25° C. After washing the film with water and drying, the film was examined by infrared absorption methods and tested for printability.

As a control, a polyethylene film treated similarly with hydrogen peroxide was tested for printability. The results were:

| Example IV | Excellent printability. |
|---|---|
| Control | Poor printability. |

The reaction product showed a substantial reduction of unsaturated groups and instead the appearance of hydroxyl groups.

*Example V*

The copolymeric film prepared as in Example I was reacted by immersion for 3 minutes in a solution at 25° C., the solution composed of 20 grams of potassium dichromate, 80 mls. of water and 150 mls. of concentrated sulfuric acid. After washing the film with water and drying, the film was tested for printability.

As a control, a polyethylene film treated similarly with chromic acid was tested for printability. The results were:

| Example V | Excellent printability. |
|---|---|
| Control | Poor printability. |

The resulting product showed a substantial reduction of unsaturated groups and instead the appearance of hydroxyl groups.

*Example VI*

The copolymeric film prepared as in Example I was treated with gaseous nitrogen tetroxide for 15 seconds at 25° C. After washing the film with water and drying, the film was examined by infrared methods and tested for printability.

As a control, a polyethylene film treated similarly with nitrogen tetroxide was tested for printability. The results were:

| Example VI | Excellent printability. |
|---|---|
| Control | Poor printability. |

The resulting product, upon infrared examination, showed the absence of unsaturated bonds, but instead the appearance of nitrite (O—N=O) and nitroso (—N=O) groups as shown by absorption bands at 1600–1675 cm.⁻¹ and 1050 cm.⁻¹, respectively.

*Example VII*

The copolymeric film prepared as in Example I was reacted for 20 minutes with an aqueous solution at 50° C., the solution containing 10% potassium permanganate. As the reaction proceeded, the color of the surface of the film turned hazy brown. Treatment of the film with 10% hydrochloric acid in isopropanol for a few minutes removed the discoloration. After washing the film with water and drying, the film was examined by infrared methods and tested for printability.

As a control, a polyethylene film treated similarly with potassium permanganate was tested for printability. The results were:

| Example VII | Excellent printability. |
|---|---|
| Control | Poor printability. |

The resulting product, upon infrared examination, showed absorption at 1000–1200 cm.⁻¹ indicating the presence of hydroxyl groups attached about equally to carbon atoms in the chain and carbon atoms of groups attached to the polymer chain.

*Example VIII*

The copolymer prepared as in Example I in the form of a finely divided powder was immersed in an aqueous solution of 30% hydrogen peroxide at 25° C. for 60 minutes. The product was washed with water, dried and pressed into a film at 150° C.

The film tested "excellent" for printability. When examined by infrared methods, absorption at 1000–1200 cm.⁻¹ was observed indicating the presence of hydroxyl groups. The examination also indicated a substantial reduction in the amount of unsaturated bonds.

Example IX

A 0.3 gram sample of the copolymer in particulate form prepared as in Example I was mixed with 10 mls. of an aqueous solution containing 40% peracetic acid and allowed to stand 12 hours at 25° C. in a stoppered container. The product was washed with methanol, dried and pressed into a film at 150° C. using a pressure of 30 tons per square inch.

When examined by infrared methods, the product showed the presence of predominantly epoxide groups (absorption at 800 cm.$^{-1}$) with some hydroxyl (absorption at 1000–1200 cm.$^{-1}$) and acetate (absorption at 1725 cm.$^{-1}$) groups. No evidence of vinyl unsaturation remained and much of the side chain methylene unsaturation and disappeared.

The product (2.0 grams prepared in a manner similar to that given above) was sealed in a glass tube under nitrogen with 10 mls. of bromobenzene and 5 mls. of 1-propanethiol. The reaction mixture was heated to 125°–135° C. and the temperature was maintained for 12 hours. Infrared examination indicated that about 15% of the epoxide linkages had been attacked by the thiol so that hydroxyl groups were attached to one carbon atom and thioether groups to the other carbon atom; the two carbon atoms had previously been attached to oxygen.

The resulting film displayed enhanced thermal stability with no apparent adverse effect on its remaining properties.

Example X

A 1.0 gram sample of the particulate reaction product of peracetic acid and the ethylene/propadiene copolymer prepared as in Example IX was heated for 9 hours in a sealed tube under nitrogen with 2.0 grams of salicyclic acid and 0.1 gram of p-toluene sulphonic acid dissolved in 20 mls. of bromobenzene. The resulting material was washed, dried and pressed into a film at 150° C. by using a pressure of 30 tons per square inch.

When examined by infrared methods, the product showed the presence of salicylate groups and a substantial decrease of epoxy and hydroxyl groups. Extraction with toluene failed to diminish the salicylate content indicating that the salicylate groups were chemically bound in the polymer.

The resulting film displayed improved resistance to ultraviolet light with no apparent adverse effect on its remaining properties.

Example XI

To 250 mls. of well agitated anhydrous tetrachloroethylene containing 0.5 ml. of vanadyl trichloride and 15 mls. of 1 molar aluminum triisobutyl in cyclohexane, there was introduced at a temperature of 95°–100° C., a 20:1 mole ratio of ethylene/propadiene gas stream at a rate of approximately 160 mls./minute. The reaction was allowed to proceed for 1 hour and 15 minutes. The gas flow was then stopped; the catalyst was destroyed by mixing in 50 mls. of methanol; and the copolymer was isolated and purified by filtering and washing in a Waring Blendor, using successively 100 mls. of 5% concentrated hydrochloric acid in isopropanol, two 150 mls. portions of distilled water and 100 mls. of methanol. The copolymer was melt pressed at a temperature of about 165° C. to form a clear film.

The film was then oxidized by immersing it in a 40% peracetic acid solution at 60° C. for 10 minutes. After washing and drying, the film was examined by infrared methods and tested for printability.

As a control, a polyethylene film was similarly treated and tested for printability. The results were:

Example XI _____ Excellent printability.
Control _____ Poor printability.

The infrared examination revealed a substantial reduction in unsaturated bonds and the appearance of epoxide groups (absorption at 800 cm.$^{-1}$).

Example XII

A 37.0 gram sample of 20:1 ethylene/propadiene copolymer (inherent viscosity of 2.5, measured in alpha-chloro-naphthalene solution at 125° C.) was dispersed in 800 ml. of chlorobenzene using an Osterizer. Under nitrogen 80 ml. of aqueous peracetic acid was added, the temperature was then raised slowly over a period of an hour to 90° C. while the reaction mixture was stirred continuously. The reaction product was isolated and purified as described in Example XI. Infrared analysis of the film pressed from the reaction product showed the presence of primarily hydroxyl groups and some acetate and epoxide groups with no detectable unsaturation remaining.

The procedure described for Example XI was repeated with 0.5 gram of sodium acetate used as a buffer for the peracetic acid. The product, upon infrared analysis, showed the presence of predominantly epoxide groups with no detectable residual unsaturation. As a film, its printability was excellent.

Example XIII

Into a reaction flask and under a blanket of nitrogen there was introduced 100 ml. of 1-hexene, 5 ml. of 1 M aluminum triisobutyl in n-hexane and 0.1 ml. of vanadyl trichloride. After stirring the mixture under the nitrogen blanket for 3 minutes at 25°–27° C., the nitrogen supply was shut off and gaseous propadiene was passed into the catalyst suspension for a period of one and one-half hours and a rate of 8 ml./minute. The gas flow was stopped and the catalyst was destroyed by addition of methanol. The product was isolated and purified as described in Example 1. The infrared analysis showed that the material contained units of both 1-hexene and propadiene. Partial extraction with toluene in a Soxhlet extractor showed no composition changed, indicating that a copolymer had been obtained.

One gram of the copolymer prepared as described above was oxidized by placing it for one minute in a beaker containing a solution of 40% peracetic acid in water at a temperature of 50° C. The product was washed with water and then dried. Infrared analysis showed predominantly the presence of epoxide functional groups.

Having fully described the invention, what is claimed is:

1. A process for preparing polymer compositions which comprises subjecting 1–35 mole percent propadiene and 65–99 mole percent of ethylene in a liquid hydrocarbon to a temperature of −40°–300° C. and a pressure of 1–1000 atmospheres in the presence of a catalyst system composed of
   (A) a compound containing at least one metal of the group consisting of metals of Groups IVa, Va, and VIa of the Periodic Table, iron, cobalt, copper, nickel and manganese, said metal having directly attached thereto at least one substituent from the group consisting of halogen, oxygen, hydrocarbon and —O-hydrocarbon; and
   (B) a reducing compound selected from the group consisting of metal hydrides and compounds having a metal of Groups I, II and III of the Periodic Table above hydrogen in the electromotive series of metals attached directly through a single bond to a carbon atom, said carbon atom selected from the group consisting of trigonal carbon and tetrahedral carbon;

isolating a polymer having pendant methylene and vinyl groups as indicated by infrared absorption bands at wavelengths of 888 cm.$^{-1}$ and 993 cm.$^{-1}$, respectively; and oxidizing said polymer with an agent selected from the group consisting of percarboxylic acids, hydrogen peroxide, potassium permanganate, alkaline hypochlorites, oxides of nitrogen, chromic acid, concentrated nitric acid, periodic acid, the oxides of osmium, vanadium, chromium, selenium and silver, hypobromous acid, hypochlorous acid, lead tetraacetate, chromyl chloride, oxygen and ozone.

2. A process as in claim 1 wherein said oxidizing agent is peracetic acid.

3. A process as in claim 1 wherein said oxidizing agent is calcium hypochlorite.

4. A process as in claim 1 wherein said oxidizing agent is hydrogen peroxide.

5. A process as in claim 1 wherein said oxidizing agent is potassium dichromate.

6. A process as in claim 1 wherein said oxidizing agent is potassium permanganate.

7. A process as in claim 1 wherein said oxidizing agent is nitrogen tetroxide.

8. An oxidized substantially linear copolymer of 65-99 mole percent ethylene and 1-35 mole percent propadiene, said copolymer containing oxygen sufficient to improve its printability, said copolymer having an inherent viscosity of at least 0.3.

9. An oxidized substantially linear copolymer of 70-91 mole percent ethylene and 9-30 mole percent propadiene, said copolymer containing oxygen sufficient to improve its printability, said copolymer having an inherent viscosity of at least 0.3.

10. A shaped article comprising an oxidized substantially linear copolymer of 65-99 mole percent ethylene and 1-35 mole percent propadiene, said copolymer containing oxygen sufficient to improve its printability, said copolymer having an inherent viscosity of at least 0.3.

11. A self-supporting film comprising an oxidized substantially linear copolymer of 65-99 mole percent ethylene and 1-35 mole percent propadiene, said copolymer containing oxygen sufficient to improve its printability, said copolymer having an inherent viscosity of at least 0.3.

References Cited in the file of this patent
UNITED STATES PATENTS

| | | |
|---|---|---|
| Re. 24,062 | Horton | Sept. 20, 1955 |
| 2,301,668 | Pier et al. | Nov. 10, 1942 |
| 2,829,130 | Greenspan et al. | Apr. 1, 1958 |

FOREIGN PATENTS

| | | |
|---|---|---|
| 776,326 | Great Britain | June 5, 1957 |
| 552,217 | Canada | Jan. 28, 1958 |